(12) United States Patent
Peterson et al.

(10) Patent No.: US 10,878,179 B2
(45) Date of Patent: Dec. 29, 2020

(54) SIMPLIFIED TEXT CORRECTION ON A TOUCH SCREEN

(71) Applicant: Lenovo (Singapore) Pte. Ltd., Singapore (SG)

(72) Inventors: Nathan J. Peterson, Durham, NC (US); Arnold S. Weksler, Raleigh, NC (US); Neal Robert Caliendo, Jr., Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 230 days.

(21) Appl. No.: 14/447,123

(22) Filed: Jul. 30, 2014

(65) Prior Publication Data
US 2016/0034436 A1 Feb. 4, 2016

(51) Int. Cl.
| G06F 40/166 | (2020.01) |
| G06F 40/232 | (2020.01) |
| G06F 3/023 | (2006.01) |
| G06F 3/0488 | (2013.01) |
| G06F 3/0484 | (2013.01) |

(52) U.S. Cl.
CPC .......... G06F 40/166 (2020.01); G06F 3/0237 (2013.01); G06F 3/0488 (2013.01); G06F 3/04842 (2013.01); G06F 3/04883 (2013.01); G06F 40/232 (2020.01)

(58) Field of Classification Search
CPC .. G06F 3/0236; G06F 3/0488; G06F 3/04842; G06F 3/04886; G06F 17/24; G06F 2203/04806; G06F 40/20; G06F 40/103; G06F 40/166; G06F 40/253; G06F 3/04883; G06F 8/38
See application file for complete search history.

(56) References Cited

U.S. PATENT DOCUMENTS

| 6,085,206 A * | 7/2000 | Domini ................. G06F 17/274 715/257 |
| 8,321,786 B2 * | 11/2012 | Lunati ................... G06F 40/232 715/257 |

(Continued)

FOREIGN PATENT DOCUMENTS

| CN | 101068411 A | 11/2007 |
| CN | 102141889 A | 8/2011 |

(Continued)

OTHER PUBLICATIONS

Huang Y, Murphey YL, Ge Y (2013) Automotive diagnosis typo correction using domain knowledge and machine learning. In: IEEE symposium on computational intelligence and data mining (CIDM), 2013, pp. 267-274. (Year: 2013).*

(Continued)

*Primary Examiner* — Ariel Mercado
(74) *Attorney, Agent, or Firm* — Ference & Associates LLC

(57) ABSTRACT

An embodiment provides a method, including: receiving, at a processor, an indication of an input including a word; providing, on a touch screen, an enlarged view of the input indicated, wherein the enlarged view is offset from an input entry field on the touch screen; and accepting, using a processor, editing input that modifies the word. Other embodiments are described and claimed.

10 Claims, 3 Drawing Sheets

(56) References Cited

U.S. PATENT DOCUMENTS

| | | | |
|---|---|---|---|
| 2007/0050654 A1* | 3/2007 | Switzer | G06F 1/3203 713/320 |
| 2008/0028286 A1* | 1/2008 | Chick | G06F 16/748 715/208 |
| 2008/0168141 A1* | 7/2008 | Keohane | G06F 17/2735 709/206 |
| 2009/0063128 A1* | 3/2009 | Seo | G06F 40/55 704/2 |
| 2011/0035209 A1* | 2/2011 | Macfarlane | G06F 3/0237 704/9 |
| 2011/0154246 A1* | 6/2011 | Oh | G06F 3/04886 715/773 |
| 2014/0040733 A1* | 2/2014 | Colley | G06F 40/166 715/256 |
| 2014/0173427 A1* | 6/2014 | Wang | G06F 17/24 715/256 |
| 2015/0067486 A1* | 3/2015 | Hochman | G06F 40/166 715/257 |
| 2015/0169975 A1* | 6/2015 | Kienzle | G06K 9/34 382/189 |

FOREIGN PATENT DOCUMENTS

| | | |
|---|---|---|
| CN | 102411522 A | 4/2012 |
| CN | 103747308 A | 4/2014 |
| CN | 103777877 A | 5/2014 |
| CN | 103885928 A | 6/2014 |

OTHER PUBLICATIONS

S. B. Basri, R. Alfred and C. K. On, "Automatic spell checker for Malay blog", 2012 IEEE International Conference on Control System Computing and Engineering (ICCSCE), Nov. 2012, pp. 506-510. (Year: 2012).*

* cited by examiner

SIMPLIFIED TEXT CORRECTION ON A TOUCH SCREEN

BACKGROUND

Electronic devices ("devices"), for example tablet computers, smart phones, navigation devices, automobile consoles, etc., may be used to provide input (e.g., text input, control inputs, etc.) via a touch sensitive surface, for example a touch screen. In some electronic devices, e.g., smart phones, tablet computing devices, kiosks and consoles, navigation systems, etc., the touch screen display is used as a primary input device and is of limited size.

In some cases, text input entry may be errant. For example, a user may type a word incorrectly or a phrase may be grammatically incorrect. Software, e.g., spell checking software, may easily identify such errant inputs, as may the user in many cases. In order to correct the errant input, users commonly must navigate within the text input entry field to select a position within the word or phrase for modification (e.g., editing).

BRIEF SUMMARY

In summary, one aspect provides a method, comprising: receiving, at a processor, an indication of an input including a word; providing, on a touch screen, an enlarged view of the input indicated, wherein the enlarged view is off set from an input entry field on the touch screen; and accepting, using a processor, editing input that modifies the word.

Another aspect provides an electronic device, comprising: a touch screen; a processor operatively coupled to the touch screen; and a memory device that stores instructions executable by the processor to: receive an indication of an input including a word; provide, on the touch screen, an enlarged view of the input indicated, wherein the enlarged view is off set from an input entry field on the touch screen; and accept editing input that modifies the word.

Another aspect provides a product, comprising: a storage device having code stored therewith, the code being executable by a processor and comprising: code that receives an indication of an input including a word; code that provides, on a touch screen, an enlarged view of the input indicated, wherein the enlarged view is off set from an input entry field on the touch screen; and code that accepts editing input that modifies the word.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
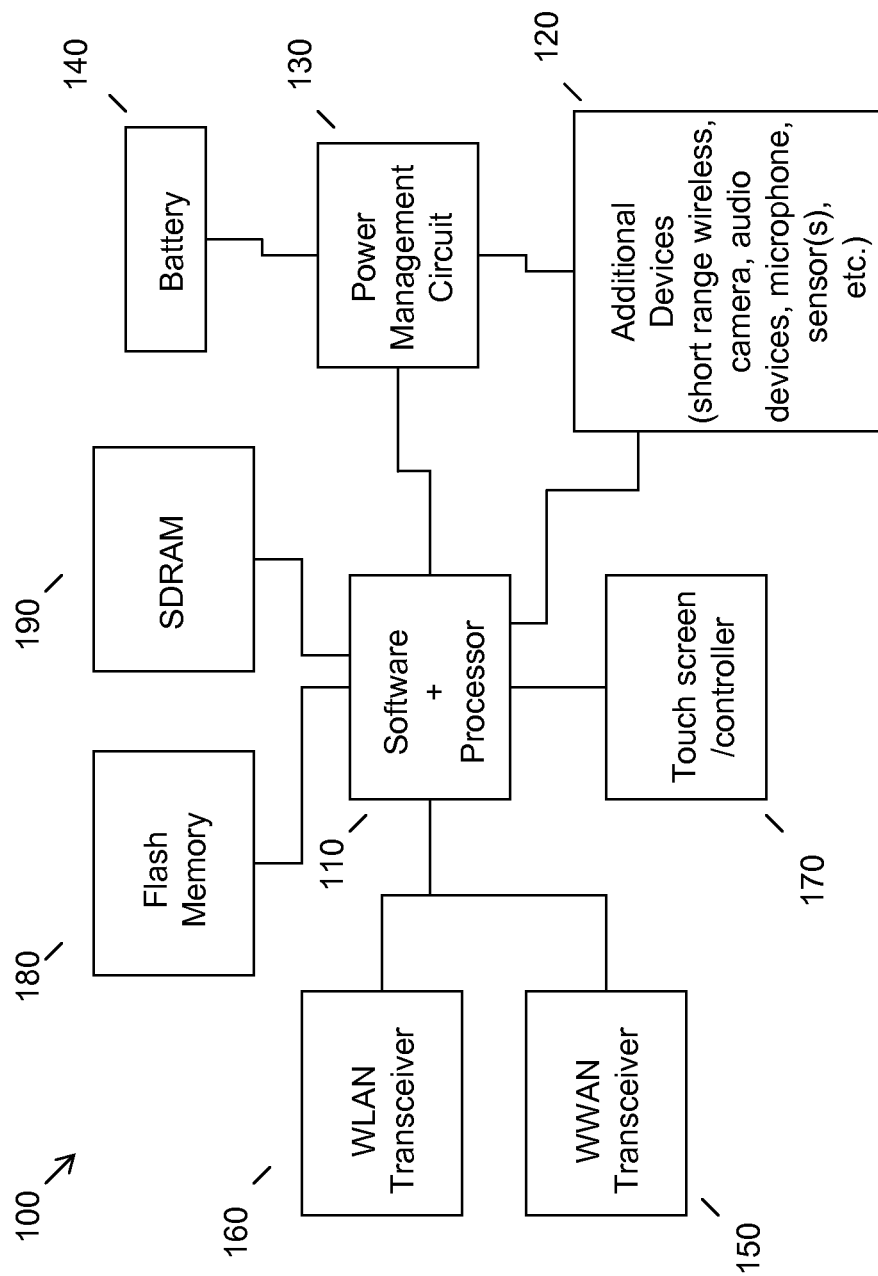
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Modifying text on a touch screen is often quite difficult. When a user touches a word, the cursor position is difficult to get into the correct spot to make the intended text corrections. This is often because the touch screen is of a small size and text is rendered in the touch screen such that individual text characters are rather small. Fine positioning of the cursor can become quite difficult in many cases.

ANDROID operating system offers a cursor that may be moved (e.g., drug) after a selection is made within a word, but this is difficult to do since it requires very small touch movements. Some implementations show a larger version of the text area when a user slides a thumb slider, but this requires an extra user action and it also doesn't differ much from previous thumb sliders, other than the fact that the user can see a larger view of the word. In any event, the user cannot interact with the word that has been enlarged. ANDROID is a registered trademark of GOOGLE Inc. in the United States and other countries.

Autocorrect will sometimes offer a word correction for the selected word, e.g., as a preview, but this doesn't always work, e.g., because the previewed word does not correct the error. Some solutions act as a magnifying glass to enlarge a portion of the target screen content, but the usefulness is limited for editing text since a group of text would require a large magnified portion and often the errant entry is not co-located with the user's finger or stylus.

Accordingly, an embodiment enlarges not just a portion of the screen around the finger (or stylus input element), but targets individual words/phrases to be enlarged in an intelligent fashion, enhancing a user's ability to see the errant input and making editing of the text easier. For example, an embodiment uses an indication of which word or words should be enlarged. Thus, if the user touches or hovers over a word, that word is enlarged so the user can edit the word quickly. Likewise, system generated indication(s), e.g., from a spell checking application, may be used to intelligently target which word or words is/are enlarged. In an embodiment, only entire words/phrases are enlarged, not sub-parts thereof.

The enlarged word may appear at a separate portion of the screen, which may be updated as different words are selected. The "box" or enlargement area containing the enlarged word may disappear/collapse responsive to indications, e.g., if no misspelled words exist in the text, if a time out occurs, or the like. The last word typed may also be displayed by default in the enlargement area or box so the user can easily edit correctly typed but unintended words. If no misspelled or otherwise errant words exist, the enlarged portion may still appear if the user touches a word, hovers over a word, etc.

If an invalid/mistyped or otherwise errant word is identified in the text before the user selects to edit it, the word may be displayed into a separate screen portion or enlargement area so that the user may easily see it and choose a position to edit the word. In some embodiments, the word enlargement may be up to or exceed 100 percent of the original or default word display size. If screen size allows, multiple incorrect words may be displayed in this enlarged area. Otherwise, words may be cycled in the available screen area used for enlargement (e.g., the most recent incorrect word, first word identified or indicated as errant, etc.).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system design found for example in tablet or other mobile computing platforms. Software and processor(s) are combined in a single unit 110. Processors comprise internal arithmetic units, registers, cache memory, busses, I/O ports, etc., as is well known in the art. Internal busses and the like depend on different vendors, but essentially all the peripheral devices (120) may attach to a single unit 110. The circuitry 100 combines the processor, memory control, and I/O controller hub all into a single unit 110. Also, systems of this type do not typically use SATA, or PCI or LPC. Common interfaces, for example, include SDIO and I2C.

There are power management circuits(s) 130, e.g., a battery management unit, BMU, which manages power as supplied, for example, via a rechargeable battery 140, which may be recharged by a connection to a power source (not shown). In at least one design, a single unit, such as 110, is used to supply BIOS like functionality and DRAM memory.

System 100 typically includes one or more of a WLAN transceiver 150 and a WLAN transceiver 160 for connecting to various networks, such as telecommunications networks and wireless Internet devices, e.g., access points. Additionally, one or more additional devices 120 is/are commonly included. Additional devices 120 for example may also include communication elements, e.g., short range wireless or other communication elements, such as near field communication elements, which allow for communications and data exchange with other proximately located devices. Commonly, system 100 will include a touch screen 170 for data input and display/rendering. System 100 also typically includes various memory devices, for example flash memory 180 and SDRAM 190.

Figure 2:
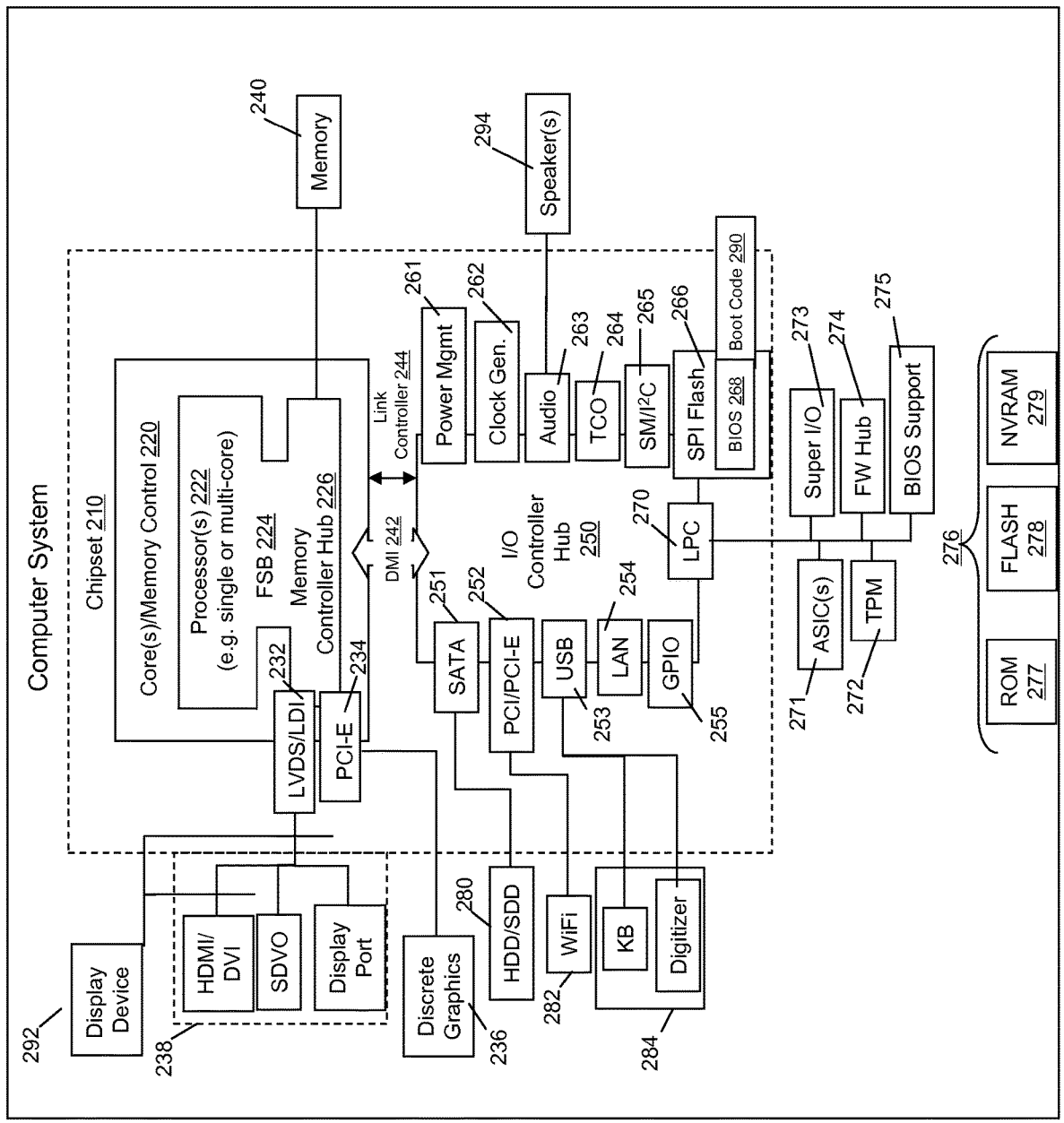
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. In the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that accept input via a touch screen, e.g., a tablet or smart phone display, a console or kiosk with a touch sensitive display, either as the primary input device or as a secondary or auxiliary device. In an embodiment, the touch screen is used to accept user inputs and provide an enlarged view of inputs that a user may wish to modify, as further explained herein.

Figure 3:
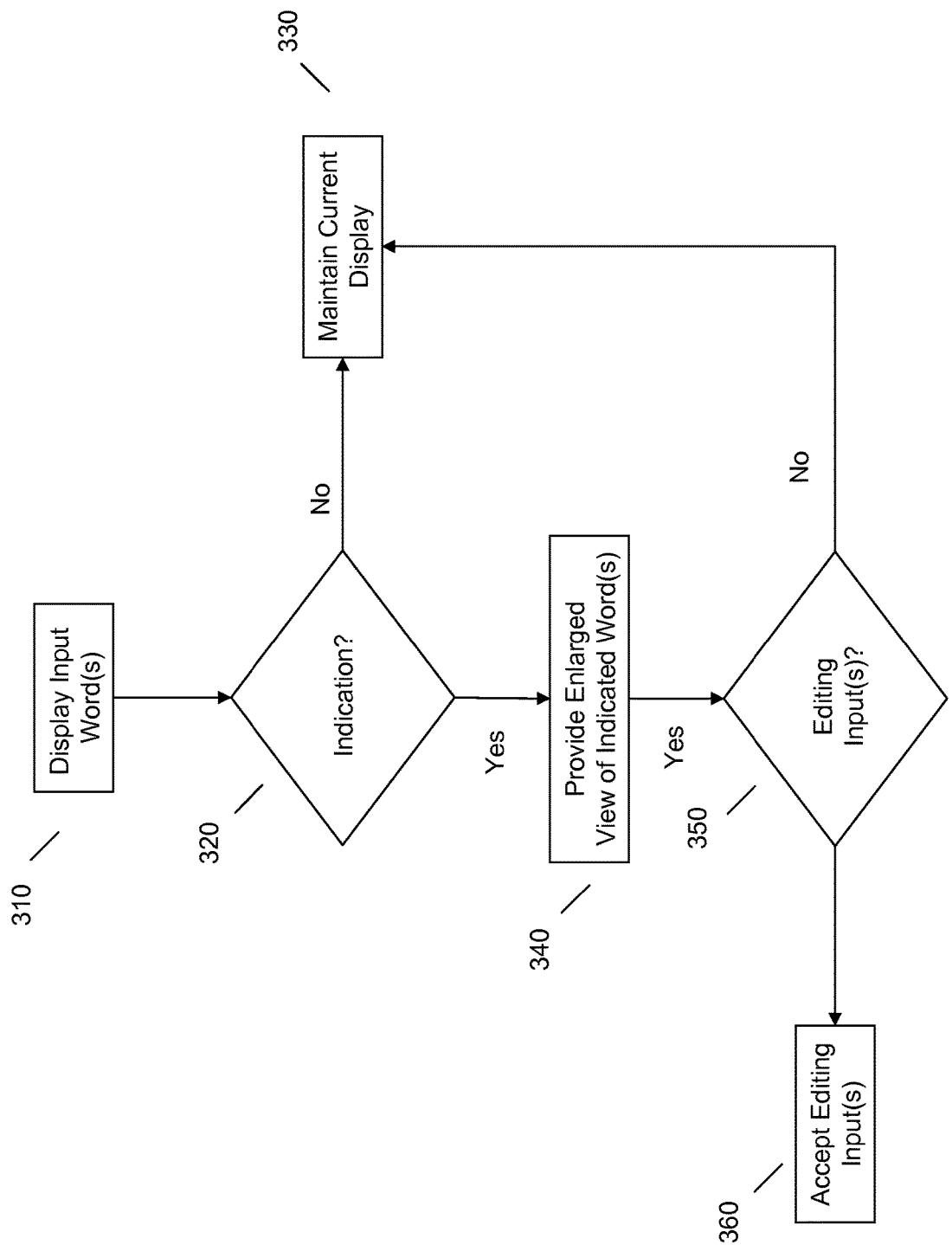
FIG. 3 illustrates an example method of simplified text correction on a touch screen.

For example, and referring to FIG. 3, an embodiment displays input word(s) on a touch screen display at 310. If an indication is received at 320, e.g., of a misspelled or otherwise errant word, an embodiment may provide an enlarged view thereof at 340. If no indication is received/detected at 320, an embodiment may maintain a current display at 330, i.e., not provide an enlarged view.

In some embodiments, a default mode of always providing the enlarged view at 340 may be set. This may correspond to the indication being issued automatically for the last n word(s) entered. Otherwise, the indication may be generated in a variety of ways.

By way of example, an embodiment may generate the indication by receiving touch input to a word from a user in the text entry field, e.g., indicating that the user wishes to edit the word. Likewise, a user hovering over a word (e.g., with his or her finger or other input element) may be used as an indication that the word is subject to user focus and review, counselling in favor of providing an enlarged view at 340.

Once the enlarged view is provided at 340, an embodiment permits a user to provide modification or editing inputs directly into the enlarged view and/or into the original text entry field. Thus, an embodiment may detect at 350 that editing inputs are received, e.g., into the enlarged view of the word or words. This allows the user to conveniently move a cursor or like indicator for providing further editing input directly into the enlarged view, which assists the user in providing fine positioning, even in a small touch screen. For example, editing inputs may be positioned using a positioning input to the enlarged view followed by substantive editing inputs to a soft keyboard displayed on the touch screen. An embodiment accepts the editing inputs at 360 and makes any appropriate changes to the enlarged view and/or the underlying text entry, as necessary.

If no editing inputs are received, an embodiment may collapse or otherwise remove the enlarged view, e.g., maintain or revert to the default or current display 330. This way, the enlarged view will not act to encumber the display screen area, e.g., if the user does not wish to edit a word. Thus, a temporary hovering or inadvertent touch to a word will initially display the enlarged view, but lack of further input, e.g., on the order of seconds, may allow an embodiment to automatically collapse the enlarged view.

As described herein, the enlarged view of the input may include a phrase containing the word, depending on how much screen space is allocated to the enlarged view, the font size of text provided therein, etc. These parameters may be set to a default and modified by a user and/or learned and automatically updated, e.g., in response to tracking a user's interaction with the enlarged view.

As described herein, the indication may take a variety of forms, for example, a user provided indication received via the touch screen and a system generated indication. The user provided indication may be, for example, a touch input within the word or a hover input associated with the word. The system generated indication may be, for example, generated by a spell check application running on the system.

In addition to a time out function, the enlarged view may be removed responsive to another predetermined criterion. For example, the predetermined criterion may be selected from the group consisting of removal of user input associated with the word (if there is persistent touching or hovering associated with the word that is then released) or receipt of a system generated input indicative of no error contained within the input, which may override the hovering or touch input.

In an embodiment, the accepting of editing input(s) at 350 may comprise accepting editing input via an area of the touch screen selected from the enlarged view and the input entry field. Whether the editing input(s) are provided to the enlarged view or the original text entry field, or both, an embodiment will update the underlying, i.e., entered, input such that the user's modifications are faithfully rendered on the touch screen display.

As will be understood by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. Any combination of one or more non-signal device readable storage medium(s) may be utilized. A storage medium may be, for example, are electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium ay be transmitted using any appropriate medium, including button limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
identifying, using a spell check application, an errant word included in user input provided to a text entry field;
providing, without additional user input, on a touch screen, an enlarged view of the errant word, wherein the enlarged view is off set from the text entry field and any other media objects presented on the touch screen;
accepting, in the enlarged view, editing input from a user that modifies the errant word in the enlarged view;
simultaneously changing, based on the accepted editing input to the errant word in the enlarged view, the errant word in the text entry field while the enlarged view is provided; and
automatically removing, without receiving additional user input, the enlarged view responsive to identifying that no additional editing input has been received within a predetermined time;
wherein the providing comprises automatically initiating a text editing mode with provision of the enlarged view.

2. The method of claim 1, wherein the enlarged view of the user input includes a phrase containing the word.

3. The method of claim 1, wherein the automatically removing is further performed responsive to a predetermined time period elapsing without further user input being received.

4. The method of claim 1, wherein the accepting comprises accepting editing input via an area of the touch screen selected from the enlarged view and the input entry field.

5. The method of claim 4, wherein the accepting comprises accepting editing input via the enlarged view.

6. An electronic device, comprising:
a touch screen;
a processor operatively coupled to the touch screen; and
a memory device that stores instructions executable by the processor to:
identify, using a spell check application, an errant word included in user input provide to a text entry field;
provide, without additional user input, on the touch screen, an enlarged view of the errant word, wherein the enlarged view is off set from the text entry field and any other media objects presented on the touch screen;
accept, in the enlarged view editing input from a user that modifies the errant word in the enlarged view;
simultaneously change, based on the accepted editing input to the errant word in the enlarged view, the errant word in the text entry field while the enlarged view is provided; and
automatically remove, without receiving any additional user input, the enlarged view responsive to identifying that no additional editing input has been received within a predetermined time;
wherein the providing comprises automatically initiating a text editing mode with provision of the enlarged view.

7. The electronic device of claim 6, wherein the enlarged view of the user input includes a phrase containing the word.

8. The electronic device of claim 6, wherein the automatic removal is performed responsive to a predetermined time period elapsing without further user input being received.

9. The electronic device of claim 6, wherein to accept comprises accepting editing input via an area of the touch screen selected from the enlarged view and the input entry field.

10. A product, comprising:
a non-transitory storage device having code stored therewith, the code being executable by a processor and comprising:
code that identifies, using a spell check application, an errant word included in user input provided to a text entry field;
code that provides, without additional user input, on a touch screen, an enlarged view of the errant word, wherein the enlarged view is off set from the text entry field and any other media objects presented on the touch screen;
code that accepts, in the enlarged view, editing input from a user that modifies the errant word in the enlarged view;
code that simultaneously changes, based on the accepted editing input to the errant word in the enlarged view, the errant word in the text entry field while the enlarged view is provided; and
code that automatically removes, without receiving additional user input, the enlarged view responsive to identifying that no additional editing input has been received within a predetermined time;
wherein the providing comprises automatically initiating a text editing mode with provision of the enlarged view.

* * * * *